United States Patent Office 3,796,720
Patented Mar. 12, 1974

3,796,720
METHOD FOR PRODUCING PYRIDOXINE AND INTERMEDIATES THEREFOR
Hideki Miki and Hiroo Saikawa, Yamaguchi, Japan, assignors to Takeda Chemical Industries, Ltd., Osaka, Japan
No Drawing. Filed Apr. 20, 1972, Ser. No. 245,905
Claims priority, application Japan, Apr. 23, 1971, 46/27,084
Int. Cl. C07d 31/36
U.S. Cl. 260—295 VB       7 Claims

ABSTRACT OF THE DISCLOSURE

This invention relates to a novel method for producing pyridine derivatives useful as vitamin $B_6$ or its analogous substances.

More particularly stating, this invention relates to a method for producing a pyridine derivative represented by the general formula:

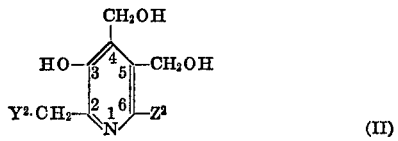

(II)

wherein each of $Y^2$ and $Z^2$ stands for a hydrogen atoms or an alkoxycarbonyl group, which comprises reacting an oxazole derivative represented by the general formula:

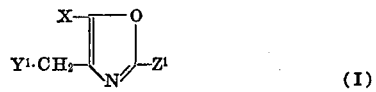

(I)

wherein X stands for an alkoxy group or an alkoxyalkoxy group and $Y^1$ and $Z^1$ are the same with or different from each other and each of them stands for a hydrogen atom, a carboxyl group or an alkoxycarbonyl group, with 2-butene-1,4-diol in the presence of sulfolane or N-methyl-2-pyrrolidone.

BACKGROUND OF THE INVENTION

Hitherto, there have been proposed various processes for the production of vitamin $B_6$ derivatives from oxazole derivatives. In most of these methods, however, oxazole derivatives are allowed to react not with 2-butene-1,4-diol as such but with butene diol derivatives of various kinds. Consequently, the resulting pyridine derivatives contain, at their 4- and 5-positions, not hydroxymethyl groups but groups derived from hydroxymethyl, which are due to the oxazole derivatives used as the starting materials, and therefore, these group at 4- and 5-positions of the pyridine ring should further be chemically converted to hydroxymethyl groups in order to provide vitamin $B_6$ active compounds. This conversion, however, requires complicated and troublesome chemical procedures which are very disadvantageous from an industrial point of view. For instance, one typical known method comprises reacting oxazole derivatives with a compound of the general formula:

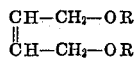

wherein R stands for alkyl.

In this known method, the resulting pyridine derivatives contain two alkoxymethyl groups at 4- and 5-positions, and for converting these groups into hydroxymethyl groups, the resulting pyridine derivatives should be subjected to reduction by the use of lithium aluminum hydride, sodium boron hydride or some other reducing agent. Such reduction as above is accompanied with complicated and troublesome procedures or handlings, and further, in this method, yield of the object compound is very poor.

On the other hand, there have also been proposed methods involving a direct one step reaction of oxazole derivatives and 2-butene-1,4-diol as such. In these methods, the reaction is conducted by the use of a large excess amount of 2-butene-1,4-diol which can act also as a reaction solvent, without using any other solvent. However, these methods give the object compound only in such a low yield as 22 to 34 percent.

Under the circumstances, the present inventors have made extensive study for improvement in the yield of the object compound in so-called one-step direct reactions, and reached an unexpected finding that a one-step direct reaction between oxazole derivatives and 2-butene-1,4-diol as such can give the object compound in 80 percent or higher yield quite exceptionally only when the reaction is conducted in the presence of sulfolane or N-methyl-2-pyrrolidone. Namely, when the reaction is conducted in the presence of any other conventional solvents than sulfolane and N-methyl-2-pyrrolidone, the yield of the object compound is only poor.

The present invention was accomplished on the basis of the above finding. The principal object of the present invention is to provide a method for producing vitamin $B_6$ active compounds by one-step direct reaction between oxazole derivatives and 2-butene-1,4-diol as such, which can give the object compound in a high yield.

Following is the detailed explanation of the method of the present invention.

In the above General Formula I, an alkoxy group designated by X is exemplified by methoxy, ethoxy and propoxy; alkoxyalkoxy group is exemplified by methoxymethoxy, methoxyethoxy, methoxypropoxy, ethoxymethoxy, ethoxyethoxy, ethoxypropoxy, propoxymethoxy, propoxyethoxy and propoxypropoxy.

An alkoxycarbonyl group designated by $Y^1$, $Y^2$, $Z^1$ or $Z^2$ in the General Formulas I and II is exemplified by methoxycarbonyl, ehtoxycarbonyl and propoxycarbonyl. A carboxyl group designated by $Y^1$ or $Z^1$ may be in a form of metal salt such as sodium salt and potassium salt.

The reaction of this invention is conducted in the presence of sulfolane or N-methyl-2-pyrrolidone. These compounds are used in an amount of not less than about one mole part, more desirably about 1 to about 5 mole parts, relative to one mole part of the compound of the General Formula I. 2-butene-1,4-diol is used in an amount of about 5 to about 25 mole parts, more desirably about 10 to about 20 mole parts, relative to one mole part of the compound of the General Formula I. The reaction temperature ranges from 80° C. to 180° C., more preferably from 120° C. to 150° C. The reaction may be conducted under normal or elevated pressure. The reaction may also be conducted in an atmosphere of an inert gas such as nitrogen, carbon dioxide, etc. Further, it is preferable to and to the reaction system about 0.1 to 1% of polymerization inhibitor such as hydroquinone so as to inhibit a polymerization.

In the present method, in case of using the oxazole compound represented by the General Formula I wherein $Y^1$ or $Z^1$ is a carboxyl group, the pyridine derivative represented by the General Formula II wherein $Y^2$ or $Z^2$ is a hydrogen atom is obtained, since the carboxyl group is converted to a hydrogen atom with decarboxylation in the course of the reaction. On the other hand, in case where $Y^1$ or $Z^1$ is an alkyl carbonyl group, the present method gives pyridine derivative represented by the General Formula II wherein $Y^2$ or $Z^2$ is the alkoxycarbonyl group corresponding to $Y^1$ or $Z^1$, and the alkoxycarbonyl group can quite easily be converted to a hydrogen atom by hydrolysis. The hydrolysis can easily proceed by a usual manner, for example, under either alkaline or acidic conditions.

The present invention is further explained by way of the following illustrative examples. In the following examples, "parts" means by weight.

EXAMPLE 1

A mixture of 88.11 parts of 2-butene-1,4-diol, 6.357 parts of 4-methyl-5-ethoxyoxazole and 6.0 parts of sulfolane is heated at 140° to 145° C. under stirring for 3 hours in a reaction vessel equipped with a reflux condenser so as to allow a reaction to take place. After the reaction is over, unreacted starting materials are removed off by distillation under reduced pressure. The residue is dissolved by adding thereto 10% hydrochloric acid. A few drops of the solution are subjected to a thin layer chromatography using silica gel and developed by use of a mixture composed of n-butanol:acetic acid:water= 4:1:1, and then the portion corresponding to pyridoxine hydrochloride is recovered by scratching with a spatula, and extracted with a phosphat buffer solution (pH 7.0). An ultraviolet absorption spectrum of the extract shows the maximum absorption band at 326 m$\mu$, which is identical with the maxmium absorption due to pyridoxine. Quantitative analysis on the maximum absorption band at 326 m$\mu$ reveals that pyridoxine hydrochloride is produced in an amount of 8.4 parts. A yield calculated on the basis of this amount is 82.0%.

When 5.05 parts of N-methyl-2-pyrrolidone is used in place of 6.0 parts of sulfolane in the above method, the end product is obtained at 80% yield.

When the above reaction is conducted in the presence of neither sulfolane nor N-methyl-2-pyrrolidone, the end product is obtained at 28% yield.

EXAMPLE 2

A reaction vessel equipped with a reflux condenser is charged with 60 parts of 2-butene-1,4-diol and 15 parts of N-methyl-2-pyrrolidone. To the mixture is slowly added dropwise 10 parts of 4-ethoxycarbonylmethyl-5-ethoxyoxazole in 3 hours under heating at 130° to 150° C. with stirring, and the whole mixture is stirred further for 1 hour. After the reaction is over, unreacted starting materials are removed off by distillation under reduced pressure. The residue is dissolved by adding thereto 10% hydrochloric acid, and then the solution is kept at 100° C. for 30 minutes. A small amount of this solution is quantitatively analyzed in the same manner as in Example 1. An ultraviolet absorption spectrum of this solution shows the maximum absorption band at 326 m$\mu$ as in Example 1. Quantitative analysis reveals that the calculated yield of the end product is 85% in terms of pyridoxine hydrochloride.

When 7 parts of sulfolane is used in place of 15 parts of N-methyl-2-pyrrolidone in the above method, the end product is obtained at 87% yield.

But, when the reaction is conducted in the presence of neither sulfolane nor N-methyl-2-pyrrolidone, the end product is obtained only at 10% yield.

Further, when the reaction is conducted in the presence of various solvents in place of N-methyl-2-pyrrolidone, the object compound is obtained at low yield. The result is shown in the following table.

| Solvent | Amount of solvent (g.) | Yield, percent |
| --- | --- | --- |
| Nitrobenzene | 8 | 21 |
| Formamide | 7 | 12 |
| Dimethyl formamide | 5 | 36 |
| Dimethyl sulfoxide | 12 | 32 |

EXAMPLE 3

A mixture of 88.11 parts of 2-butene-1,4-diol, 8.55 parts of 4-hydroxcarbonylmethyl-5-ethoxyoxazole and 6.0 parts of sulfolane is heated at 120° to 125° C. for 3 hours in a reaction vessel equipped with a reflux condenser to allow a reaction to take place. After the reaction is over, unreacted butenediol and sulfolane are removed off by distillation under reduced pressure. The residue is dissolved by adding thereto 10% hydrochloric acid, and the solution is heated at 100° C. for 30 minutes. A small amount of the resultant is quantitatively analyzed in the same manner as in Example 1. Further, an ultraviolet absorption spectrum thereof shows the maximum absorption band at 326 m$\mu$ as in Example 1. The quantitative analysis reveals that the calculated yield is 85% in terms of pyridoxine hydrochloride.

The end product is obtained at 80% yield, when 5.05 parts of N-methyl-2-pyrrolidone is used in place of 6.0 parts of sulfolane in the above method.

When the reaction is conducted in the presence of neither sulfolane nor N-methyl-2-pyrrolidone in the same manner as mentioned above, the end product is obtained at 15% yield.

EXAMPLE 4

A mixture of 88.11 parts of 2-butene-1,4-diol, 8.55 parts of 2-hydroxycarbonyl-4-methyl-5-ethoxyoxazole and 6.0 parts of sulfolane is heated at 140° to 145° C. for 3 hours under stirring in a reaction vessel equipped with a reflux condenser to allow a reaction to take place. After the reaction is over, unreacted butenediol and sulfolane are removed off by distillation under reduced pressure. The residue is dissolved by adding thereto 10% hydrochloric acid, followed by treatment in the same manner as in Example 1. The calculated yield of the end product is 85%.

The end product is obtained at 80% yield, when 7.0 parts of N-methyl-2-pyrrolidone is used in place of 6.0 parts of sulfolane in the above method.

The end product is obtained only at 20% yield, when the reaction is conducted in the presence of neither sulfolane nor N-methyl-2-pyrrolidone in the same manner as mentioned above.

EXAMPLE 5

A mixture of 88.11 parts of 2-butene-1,4-diol, 8.55 parts of 4-methyl-5-($\beta$-ethoxy)ethoxyoxazole and 6.0 parts of sulfolane is heated at 140° to 145° C. for 3 hours under stirring in a reaction vessel equipped with a reflux condenser to allow a reaction to take place. After the reaction is over, unreacted starting materials are removed off by distillation under reduced pressure, whereby dark red syrup of a reaction product is obtained as a residue. The product is dissolved in 10% hydrochloric acid and the solution is heated at 70° C. for 30 minutes. The solution thus treated is quantitatively analyzed in the same manner as in Example 1. A yield of pyridoxine hydrochloride is 78%.

When the reaction is conducted in the absence of sulfolane, the end product is obtained only at 19% yield.

EXAMPLE 6

A mixture of 88.11 parts of 2-butene-1,4-diol, 9.95 parts of 2-ethoxycarbonyl-4-methyl-5-ethoxyoxazole and 6 parts of sulfolane is heated at 150° to 155° C. for 4 hours in a reaction vessel equipped with a reflux condenser to allow a reaction to take place. After the reaction is over, unreacted starting materials are removed off by distillation under reduced pressure. The residue is extracted with 10% hydrochloric acid and neutralized with sodium bicarbonate. The resultant is extracted with ethyl acetate and the solvent is distilled off. This proceduce gives 10.3 parts (85% yield) of 2-methyl-3-hydroxy-4,5-bishydroxymethylpyridine - 6 - ethylformate as brown syrup. The product is hydrolyzed by boiling for 1 hour in 10% hydrochloric acid. Quantitative analysis of the resultant in the same manner as in Example 1 reveals that 8.2 g. of pyridoxine hydrochloride is obtained by the above procedure.

When the reaction is conducted in the absence of sulfolane, 2 - methyl-3-hydroxy-4,5-bishydroxymethylpyridine-2-ethylformate is obtained at 15% yield.

What is claimed is:

1. A method for producing a pyridine derivative represented by the general formula:

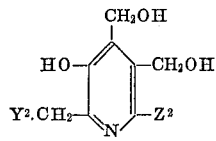

wherein each of $Y^2$ and $Z^2$ is a hydrogen atom or an alkoxycarbonyl group, which comprises reacting an oxazole derivative represented by the general formula:

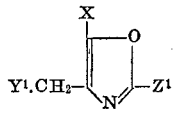

wherein X is an alkoxy group having 1 to 3 carbon atoms or an alkoxyalkoxy group whose two alkoxy moieties have 1 to 3 carbon atoms and $Y^1$ and $Z^1$ are the same with or different from each other and each of them is a hydrogen atom, a carboxyl group or an alkoxycarbonyl group having 2 to 4 carbon atoms with 2-butene-1,4-diol in the presence of sulfolane or N-methyl-2-pyrrolidone.

2. A method according to claim 1, wherein an oxazole derivative is 4-ethoxycarbonylmethyl-5-ethoxyoxazole.

3. A method according to claim 1, wherein an oxazole derivative is 4-hydroxycarbonylmethyl-5-ethoxyoxazole.

4. A method according to claim 1, wherein the reaction is conducted in the presence of sulfolane.

5. A method according to claim 1, wherein the reaction is conducted in the presence of N-methyl-2-pyrrolidone.

6. A method according to claim 1, wherein sulfolane or N-methyl-2-pyrrolidone is used in an amount of not less than about one mole part relative to one mole part of the compound of the General Formula I.

7. A method according to claim 1, wherein sulfolane or N-methyl-2-pyrrolidone is used in an amount of about 1 to about 5 mole parts relative to one mole part of the compound of the General Formula I.

References Cited

UNITED STATES PATENTS

| | | | |
|---|---|---|---|
| 3,413,297 | 11/1968 | Miki et al. | 260—297.5 |
| 3,227,721 | 1/1966 | Pfister et al. | 260—294.9 |

OTHER REFERENCES

Raphael et al.: Advances in Organic Chemistry, Methods and Results, vol. 5, Interscience Publishers, pp. 2 and 3, 1965.

ALAN L. ROTMAN, Primary Examiner

U.S. Cl. X.R.

260—297.5; 424—266, 263